(12) United States Patent
Duboc et al.

(10) Patent No.: US 6,662,261 B2
(45) Date of Patent: Dec. 9, 2003

(54) DATA PROCESSING ARRANGEMENT AND METHOD FOR CONNECTING STORAGE ELEMENTS AND GROUPS SELECTIVELY TO PROCESSING CIRCUITS

(75) Inventors: Jean-Francois Duboc, Saint Laurent du Var (FR); Saida Barnas, Super Antibes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 219 days.

(21) Appl. No.: 09/884,220

(22) Filed: Jun. 19, 2001

(65) Prior Publication Data

US 2002/0010842 A1 Jan. 24, 2002

(30) Foreign Application Priority Data

Jun. 20, 2000 (FR) .............................. 00 07865

(51) Int. Cl.$^7$ .............................. G06F 13/00
(52) U.S. Cl. .............................. 711/5; 711/66
(58) Field of Search .............................. 711/5; 710/66, 710/307

(56) References Cited

U.S. PATENT DOCUMENTS 4,358,826 A * 11/1982 Bodner et al. ............... 711/109
4,739,473 A * 4/1988 Ng et al. ..................... 711/167
4,785,393 A   11/1988 Chu et al. .................... 712/221
5,613,152 A * 3/1997 Van Meerbergen et al. ... 712/23
5,761,348 A * 6/1998 Honma ........................ 710/66
5,897,665 A   4/1999 Padwekar .................... 711/212
6,002,880 A * 12/1999 Slavenburg .................. 712/24
6,182,103 B1 * 1/2001 Zierhofer ..................... 708/319

* cited by examiner

Primary Examiner—Glenn Gossage
(74) Attorney, Agent, or Firm—Steven R. Biren (57) ABSTRACT

In a data processing arrangement that includes multiple processing circuits, a group of storage elements provides temporary storage of data intended for the processing circuits. An element selection circuit enables a single storage element to be selected from a plurality of storage elements in order to supply the content of the selected storage element to an input of a processing circuit. A group selection circuit enables a group of storage elements to be selected from a plurality of separate groups of storage elements in order to supply the contents of all the storage elements forming part of the selected group to an input of another processing circuit. Such an arrangement affords a flexible and efficient use of all the storage elements. As a result, a comparatively small number of storage elements are necessary, which leads to cost reduction. The relevant arrangement may be employed in, for example, a digital signal processor capable of (finite impulse response) FIR filtering.

3 Claims, 5 Drawing Sheets

DATA PROCESSING ARRANGEMENT AND METHOD FOR CONNECTING STORAGE ELEMENTS AND GROUPS SELECTIVELY TO PROCESSING CIRCUITS

BACKGROUND OF THE INVENTION

FIELD OF THE INVENTION

The present invention relates to a data processing arrangement that includes a plurality of processing circuits and a group of storage elements for the temporary storage of data intended for the processing circuits.

SUMMARY OF THE INVENTION

A data processing arrangement in accordance with the present invention can be used in, for example, a digital signal processor (DSP) which can carry out finite impulse response (FIR) filtering (FIR is an acronym for the phrase Finite Impulse Response) and can be implemented in the following manner. The group of storage elements forms a bank of registers to which each processing circuit has access. Each storage element (register) serves to store one data block. A data block is applied to a processing circuit by means of a selection circuit. This selection circuit selects a storage element on the basis of a control word. The data block stored in the selected storage element is applied to the relevant processing circuit.

It is an object of the invention to enable a cost reduction to be achieved.

According to the invention, a data processing arrangement as defined in the opening sentence has the following characteristic features. The arrangement comprises an element selection circuit for selecting a single storage element from a plurality of storage elements in order to apply the content of the selected storage element to an input of a processing circuit. The arrangement further comprises a group selection circuit for selecting a group of storage elements from a plurality of separate storage element groups in order to apply the contents of all the storage elements forming part of the selected group to an input of another processing circuit.

The invention takes the following aspects into consideration. There are applications in which a given type of data requires a certain processing while another type of data requires a different processing. The different data types need not necessarily be equal in size. An example of such an application is FIR filtering in accordance with the Global System for Mobile (GSM) telephony standard. In such an application the input data and the filter coefficient comprise 16 bits that are to be multiplied in order to obtain weighted input data. Adding up of the weighted input data produces terms of 32 bits or even 36 or 40 bits after addition.

In accordance with the prior art each storage element (register) is adapted to store one whole data block. Consequently, the largest data block will dictate the size of the storage elements. For example, the size of the storage elements will be 32 bits for an application as described above. A 16 bit input data block will then be stored in a 32 bit storage element. This also applies to a 16 bit filter coefficient. Consequently, a storage element containing an input data block or a filter coefficient will contain padding bits, for example zeros (0), to achieve filling out to 32 bits. As a result, the prior-art group of storage elements will not be utilized very efficiently in an application as described hereinbefore.

The following principle enables the group of storage elements to be used more efficiently. Certain storage elements are reserved for a certain type of data while the other storage elements are reserved for data of another type. In accordance with this principle, there will be two different sub-groups of storage elements in an application as described hereinbefore. There will be one sub-group of 16 bit storage elements for storing the input data and the filter coefficients. There will be another sub-group of 32 bit storage elements for storing the weighted input data and the running total thereof.

During data processing, it is possible that comparatively many data of a certain type and comparatively few data of another type are to be stored in a given time interval. The opposite may be the case in another time interval. This means that, if the principle described hereinbefore is applied, each sub-group of storage elements should include an adequate number of storage elements. Consequently, this will require a comparatively large number of storage elements, which is expensive, and these storage elements will not be used very efficiently.

In accordance with the invention, an element selection circuit enables a single storage element to be selected in order to supply the content of this storage element to an input of a processing circuit. A group selection circuit enables a group of storage elements to be selected from a plurality of separate groups of storage elements in order to supply the contents of all the storage elements forming part of the selected group to the input of another processing circuit.

Thus, the invention makes it possible to use a storage element for storing a data block of a small size as a whole, but also for storing a part of a large-size data block. In the last-mentioned case, the other parts of the data block will be stored in the other storage elements belonging to the same group. Thus, the invention enables any type of data to be stored in one or more storage elements without the use of padding bits. Consequently, the invention enables a flexible and efficient use of all the storage elements. As a result of this, the invention makes it possible to store data to be processed as well as the intermediate and final results by means of a comparatively small number of storage elements. The invention consequently enables a cost reduction to be achieved.

BRIEF DESCRIPTION OF THE DRAWINGS

These as well as other aspects of the invention will be described in detail with reference to the Figures.

The following remarks relate to the reference signs. Similar entities bear identical reference letters in all the Figures. A plurality of similar entities may appear in a single Figure. In that case, a numeral is suffixed to the reference letters in order to distinguish between similar entities. The numeral or suffix may be omitted for convenience. This applies both to the description and to the claims.

DETAILED DESCRIPTION OF THE PREFERRED EMBODIMENTS

Figure 1:
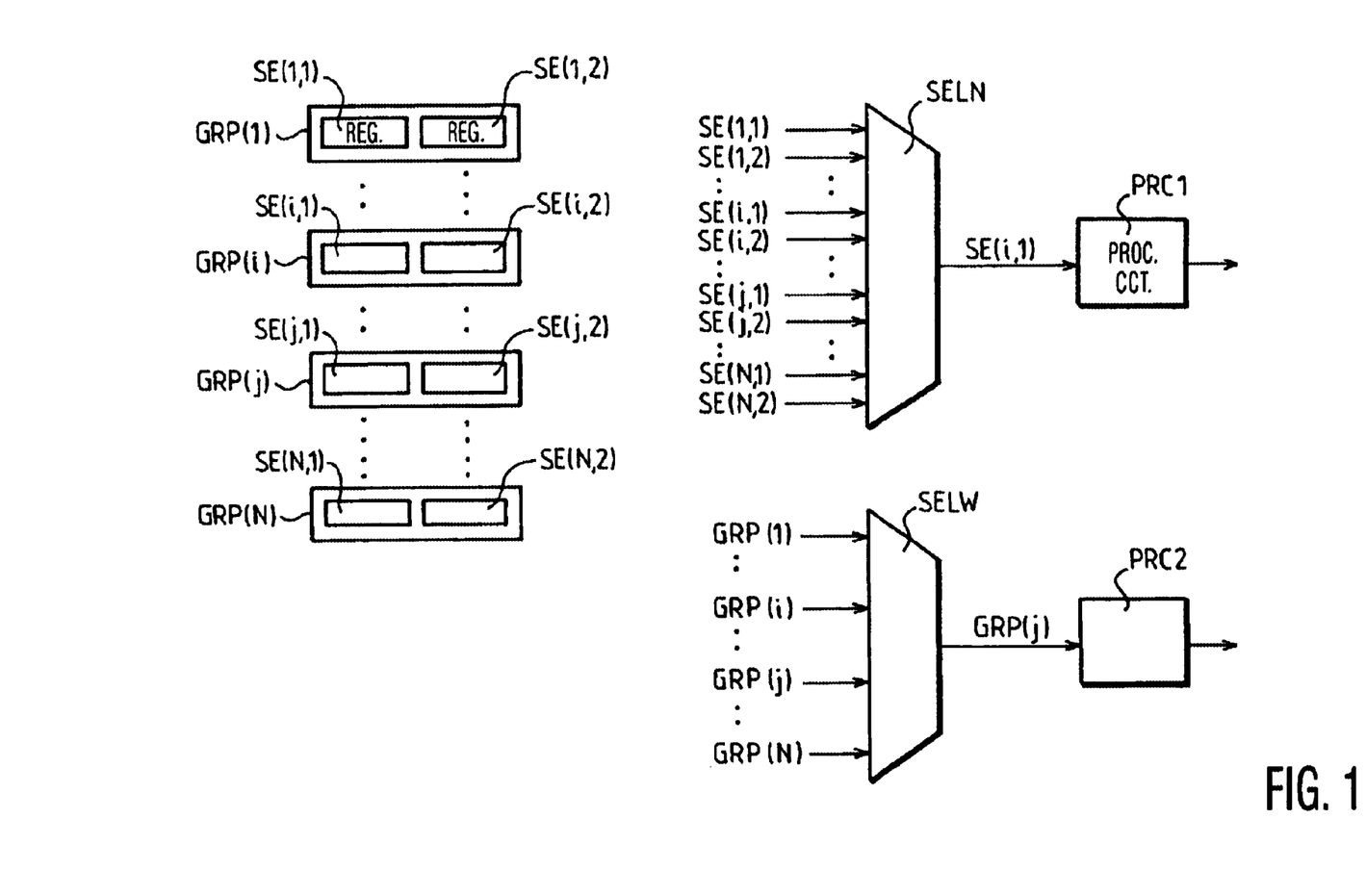
FIG. 1 is a conceptual diagram of methods and arrangements utilized in accordance with the present invention.

FIG. 1 illustrates basic characteristic features described hereinbefore. A data processing arrangement comprises a plurality of processing circuits (PCR). A group of storage elements (SE) serves for temporarily storing data intended for the processing circuits.(PCR). An element selection circuit (SELN) enables a single storage element (SE(i,1)) to be selected from a plurality of storage elements (SE(1,1), SE(1,2), ... SE(N,1), SE(N,2)) in order to supply the content of the selected storage element (SE(i,1)) to an input of a processing circuit (PRC1). A group selection circuit (SELW) enables a group of storage elements (GRP(j)) to be selected from a plurality of separate groups of storage elements (GRP(1)–GRP(N)) in order to supply the contents of storage elements (SE) forming part of the selected group (GRP(j)) to an input of another processing circuit (RPC2).

The characteristic features illustrated in FIG. 1 may be used in, for example, a digital signal processor which can carry out FIR filtering. FIR filtering mainly consists of forming a weighted combination of different adjacent data. FIR filtering consequently entails multiplications and additions. The multiplications serve to multiply the relevant adjacent data by respective weighting coefficients in order to obtain weighted data. The additions serve to form a running total of the weighted data in order to obtain filtered data, i.e. output data.

Figure 2:
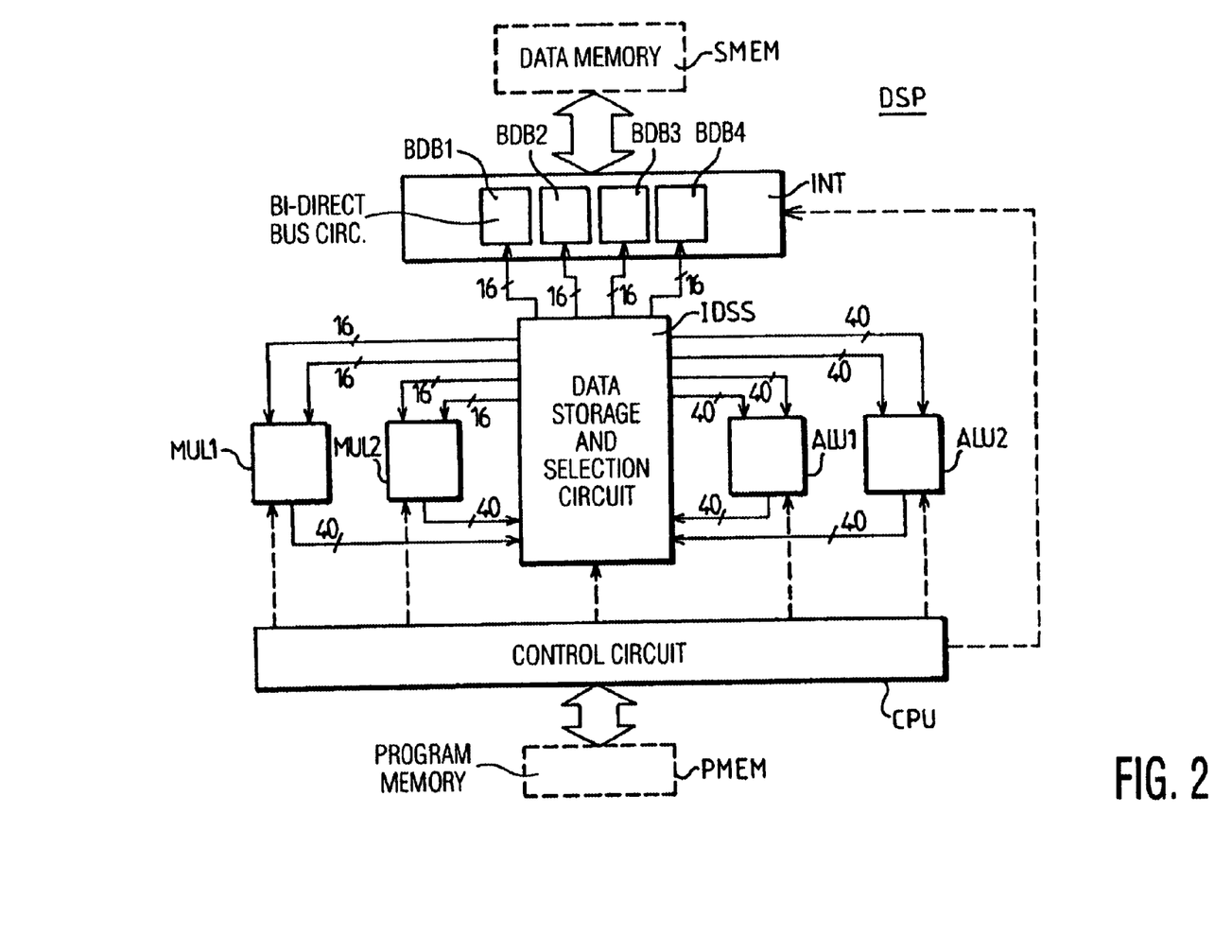
FIG. 2 is a block diagram which shows a digital signal processor.

FIG. 2 shows a digital signal processor capable of carrying out an FIR filtering. The digital signal processor (DSP) comprises an interface (INT), a data storage and selection circuit (IDSS), a central processing unit or control circuit (CPU), and four processing circuits: a first multiplier (MUL1), a second multiplier (MUL2), a first arithmetic and logical unit (ALU1) and a second arithmetic and logical unit (ALU2). The interface (INT) comprises four bi-directional bus circuits (BDB). A bus couples the interface (INT) to a data memory (SMEM), shown in broken lines. Another bus couples the control circuit (CPU)to a program memory (PMEM), also shown in broken lines. An internal bus system couples the data storage and selection circuit (IDSS) to the four bi-directional bus circuits (BDB) and to the four processing circuits (MUL1, MUL2, ALU1, ALU2). The internal buses are shown as arrows with associated numerals. A numeral indicates the size of the relevant bus in numbers of bits.

The digital signal processor (DSP) basically operates as follows. The interface (INT) transfers data to be processed from the data memory (SMEM) to the data storage and selection circuit (IDSS). The data storage and selection circuit (IDSS) stores the data temporarily. The four processing circuits (MUL1, MUL2, ALU1, ALU2) perform arithmetic operations upon the data stored in the data storage and selection circuit (IDSS) so as to obtain processed data. The interface (INT) transfers the processed data from the data storage and selection circuit (IDSS) to the data memory (SMEM). Processed data may be, for example, a weighted combination of data stored in the data memory (SMEM). To form such a combination the multipliers (MUL) multiply the relevant data by respective weighting coefficients and the arithmetic and logical units (ALU) add the weighted data supplied by the multipliers (MUL).

The operations described above are performed under control of the control circuit (CPU) in response to instructions stored in the program memory (PMEM). More specifically, the control circuit (CPU) reads the instructions in the program memory and executes them. The execution of an instruction entails the generation of control words for one or more circuits of the digital signal processor (DSP). An instruction may involve, for example, the multiplication of data by a weighting coefficient by means of the first multiplier (MUL1) so as to obtain weighted data. In this case, the control circuit (CPU) generates control words for the data storage and selection circuit (IDSS) in order to cause this circuit: (1) to supply the desired data to an input of the first multiplier (MUL1), (2) to supply the weighting coefficient to another input of the first multiplier (MUL1), and (3) to store the weighted data supplied by the first multiplier (MUL1) at a certain internal storage location.

Figure 3:
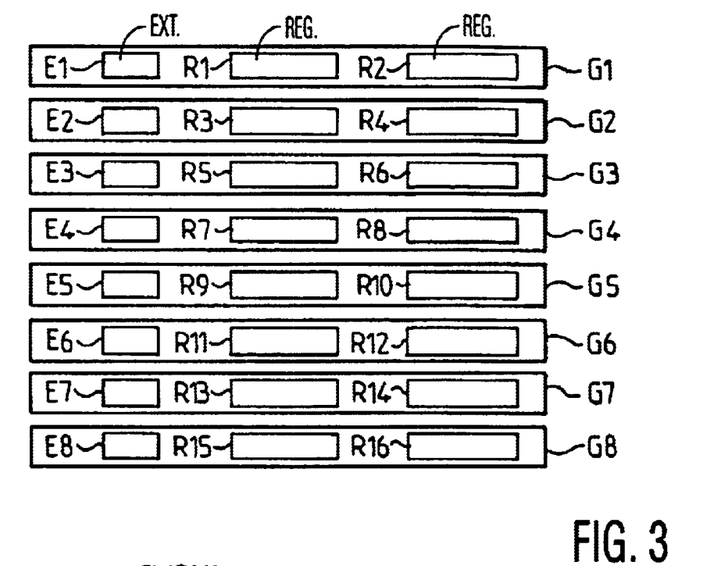
FIG. 3 is a block diagram which shows a group of storage elements forming part of the digital signal processor.

FIG. 3 shows an arrangement of storage elements forming part of the data storage and selection circuit (IDSS). The arrangement comprises sixteen 16 bit registers numbered (R1–R16) from the first to the sixteenth register and eight 8 bit extension registers numbered (E1–E16) from the first to the eighth register. The first and the second register (R1, R2) and the first extension register (E1) form a first register group (G1). The third and the fourth register (R3, R4) and the second extension register (E2) form a second register group (G2), and so on. Thus, there are eight register groups numbered from the first to the eighth group (G1–G8). A register group (G) can store a 40 bit data block. The least significant bits (0–15) are stored in the register of the group having the highest number. The most significant bits (16–31) are stored in the register of the group having the lowest number. The extension bits (32–39) are stored in the extension register.

Figure 4:
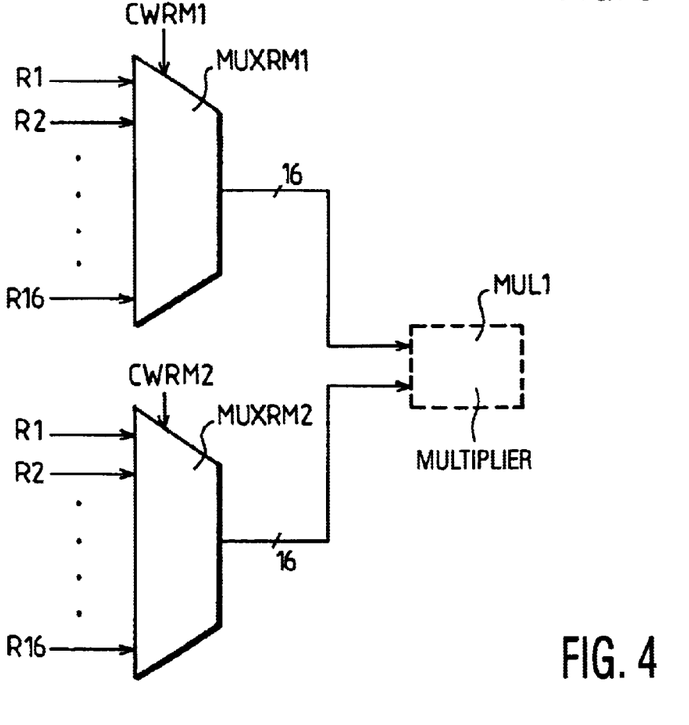
FIG. 4 is a block diagram which shows two register/multiplier multiplexers forming part of the digital signal processor.

FIG. 4 shows two register/multiplier multiplexers (MUXRM) associated with the first multiplier (MUL1). The register/multiplier multiplexers (MUXRM) form part of the data storage and selection circuit (IDDS). A first register/multiplier multiplexer (MUXRM) couples one of the registers (R) shown in FIG. 3 to the first input of the first multiplier (MUL1) in dependence on a first register/multiplier control word (CWRM1). As a result, the first register/multiplier control word (CWRM1) defines the register (R) which will supply a 16 bit data block to the first input of the first multiplier (MUL1). A second register/multiplier multiplexer (MUXRM2) couples one of the registers (R) shown in FIG. 3 to a second input of the first multiplier (MUL1) in dependence on a second register/multiplier control word (CWRM2). As a result, the second register/multiplier control word (CWRM2) defines the register (R) which will supply a 16 bit data word to the second input of the first multiplier (MUL1). The data storage and selection circuit (IDDS) comprises two further register/multiplier multiplexers for the second multiplier (MUL2) shown in FIG. 2. These multiplexers operate in a similar maimer.

Figure 5:
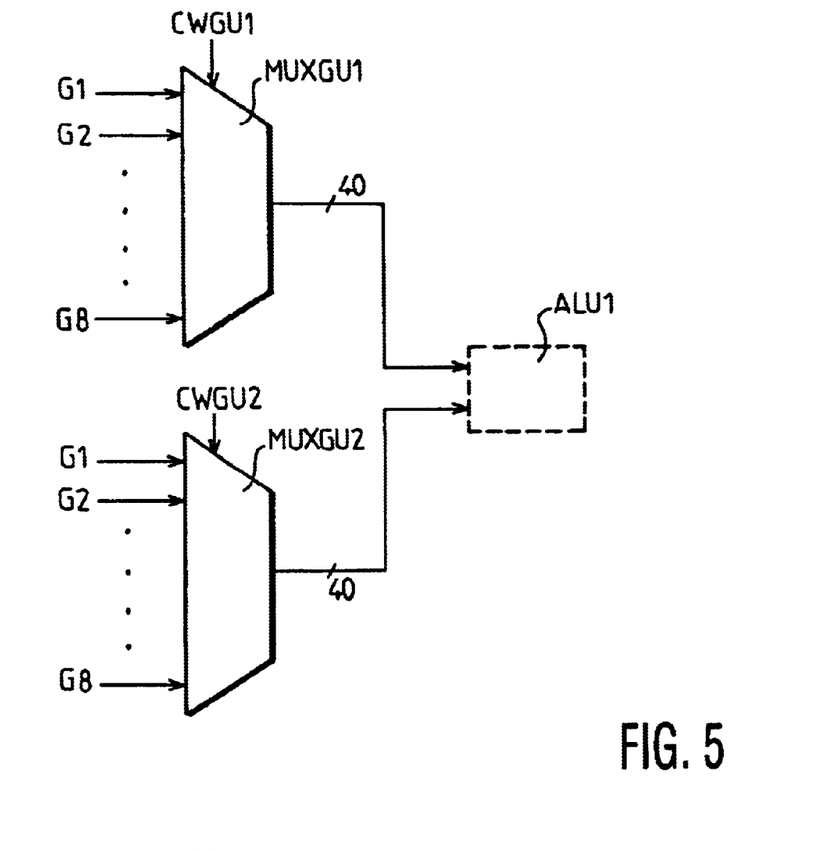
FIG. 5 is a block diagram which shows two group/unit multiplexers forming part of the digital signal processor.

FIG. 5 shows two group/unit multiplexers (MUXGU) associated with the first arithmetic and logical unit (ALU1). The group/unit multiplexers (MUXGU) form part of the data storage and selection circuit (IDSS). A first group/unit multiplexer (MUXGU1) couples a group of registers (G) shown in FIG. 3 to a first input of the first arithmetic and logical unit (ALU1) in dependence on a first group/unit control word (CWGU1). As a result, the first group/unit control word (CWGU1) defines the group of registers (G) which will supply a 40 bit data block to the first input of the first arithmetic and logical unit (ALU1). A second group/unit multiplexer (MUXGU2) couples a group of registers (G) shown in FIG. 3 to a second input of the first arithmetic and logical unit (ALU1) in dependence on a second group/unit control word (CWGU2). As a result, the second group/unit control word (CWGU2) defines the group of registers which will supply a 40 bit data block to the second input of the first arithmetic and logical unit (ALU1). For each group of registers, the register of the group having the highest number will supply the least significant bits (0–15), register of the group having the lowest number will supply the most significant bits (16–31) and the extension register will supply extension bits (32–39), if any. The data storage and selection circuit (IDSS) comprises two further group/unit multiplexers for the second arithmetic and logical unit (ALU2) shown in FIG. 2. These multiplexers operate in the same way.

Figure 6:
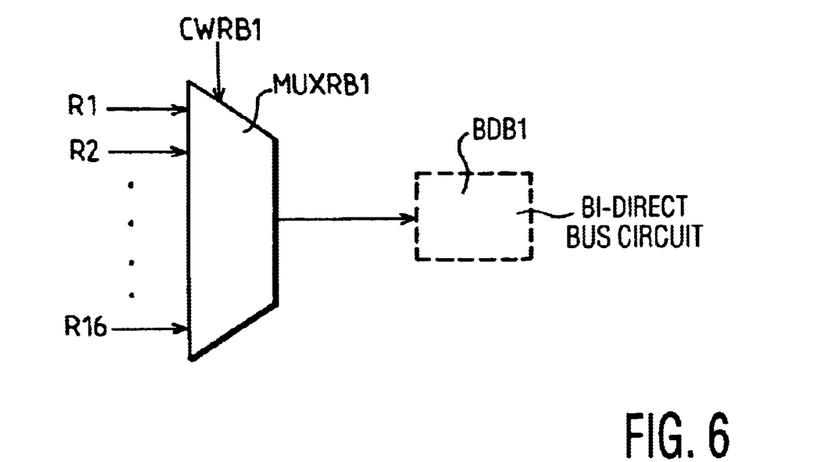
FIG. 6 is a block diagram which shows a first register/bus multiplexer forming part of the digital signal processor.

FIG. 6 shows a register/bus multiplexer (MUXRB1) for the first bi-directional bus circuit (BDB1). The register/bus multiplexer (MUXRB1) forms part of the data storage and selection circuit (DSS). It couples one of the registers shown in FIG. 3 to the first bi-directional bus circuit (DB1) in dependence on a register/bus control word (CWRB1). As a result, the register/bus control word (CWRB1) defines the register which will supply a 16 bit data block to the first bi-directional bus circuit (BDB1). The data storage and selection circuit (IDSS) comprises three further register/bus multiplexers for the three other bi-directional bus circuits (BDB2, BDB3, BDB4) shown in FIG. 2.

Figure 7:
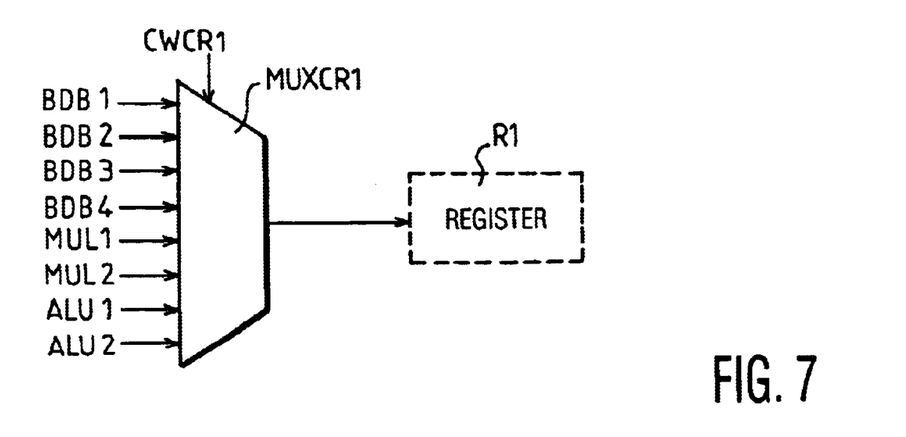
FIG. 7 is a block diagram which shows a first circuit/register multiplexer forming part of the digital signal processor.

FIG. 7 shows a circuit/register multiplexer (MUXCR1) for the first register (R1). The circuit/register multiplexer (MUXCR1) forms part of the data storage and selection circuit (IDSS). It couples one circuit of a plurality of circuits to the first register (R1) shown in FIG. 3 in dependence on a circuit/register control word (CWCR1). As a consequence, the circuit/register control word (CWCR1) defines the circuit which will supply a group of 16 bits to the first register (R1). The relevant circuits are: the bi-directional bus circuits (BDB), the multipliers (MUL) and the arithmetic and logical units (ALU). As regards the multipliers (MUL) and the arithmetic and logical units (ALU), it is to be noted that the group of 16 bits applied to the first register (R) will be the most significant bits (16–31). The least significant bits (0–15) of the data will be applied to the second register (R2) by means of another circuit/register multiplexer. Any extension bits (32–39) of the data block will be applied to the first extension register (E1) by means of a circuit/extension multiplexer. Thus, the data storage and selection circuit (IDSS) comprises 16 circuit/register multiplexers, one for each register shown in FIG. 3, and 8 circuit/extension multiplexers, one for each extension registers shown in FIG. 3.

Figure 8:
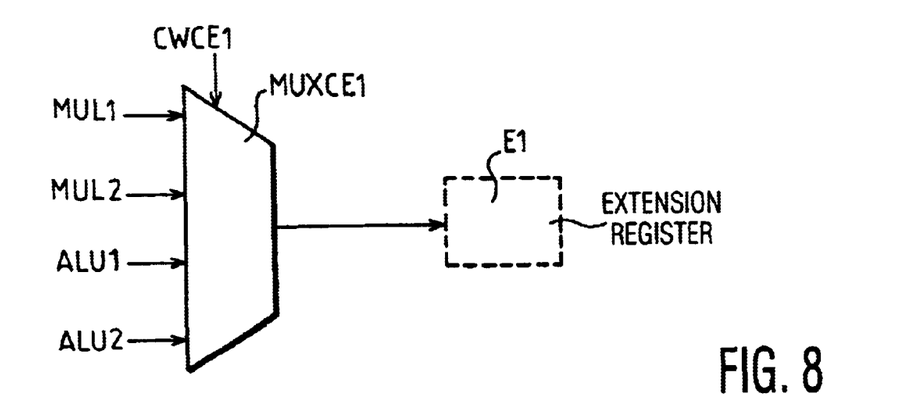
FIG. 8 is a block diagram which shows a first circuit/extension multiplexer forming part of the digital signal processor.

FIG. 8 shows the circuit/extension multiplexer (MUXCE1) for the first extension register (E1) already mentioned in the preceding paragraph. The circuit/extension multiplexer (MUXCE1) couples one of the multipliers (MUL) or one of the arithmetic and logical units (ALU) to the first extension register (E1) shown in FIG. 3 in dependence on a circuit/extension control word (CWCE1). As a result, the circuit/extension control word (CWCE1) defines the multiplier (MUL) or the of the arithmetic and logical unit (ALU) that will supply 8 extension bits (32–29 to the first extension register (E1). The other circuit/extension multiplexers of the data storage and selection circuit (IDSS) operate in the same way.

Figure 9:
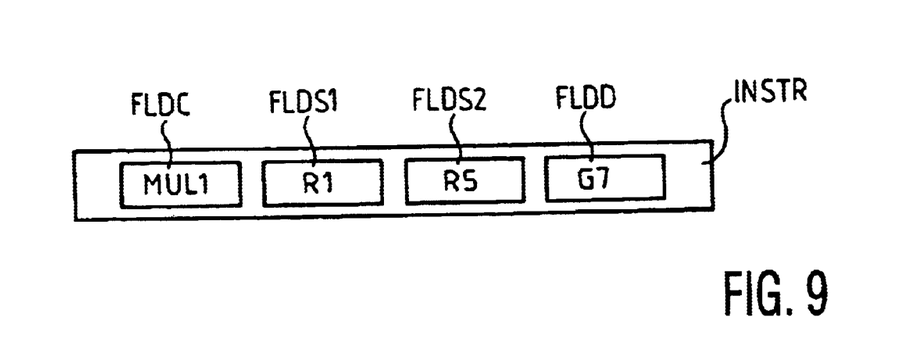
FIG. 9 is a block diagram which shows an instruction for the digital signal processor.

FIG. 9 shows an instruction (INSTR) for the digital signal processor (DSP). The instruction has four fields: a circuit field (FLDC), a first source field (FLDS1), a second source field (FLDS2) and a destination field (FLDD). The circuit field (FLDC) indicates one of the multipliers (MUL) or one of the arithmetic and logical units (ALU) shown in FIG. 2. If this is a multiplier, the first source field (FLDS1) and the second source field (FLDS2) each specify a register whose content will be applied to, respectively, a first input and a second input of the multiplier. In the case of an arithmetic and logical unit, the first source field (FLDS1) and the second source field (FLDS2) each specify a group of registers whose content will be applied to, respectively, a first input and a second input of the arithmetic and logical unit. The destination field (FLDD) indicates a group of registers into which the result supplied by the multiplier or the arithmetic and logical unit will be loaded.

It has already been explained that the control circuit (CPU) generates control words for different circuits in response to an instruction. Let it be assumed, for example, that the content of the instruction is as illustrated in FIG. 9. This means that the circuit field (FLDC), the first source field (FLDS1), the second source field (FLDS2) and the destination field (FLDD) respectively specify the first multiplier (MUL1), the first register (R1), the fifth register (R5), and the seventh group of registers (G7). In this case, the control circuit (CPU) will generate control words: (1) for the register/multiplier multiplexers associated with the first multiplier (MUL1), (2) for the circuit/register multiplexers associated with the thirteenth and the fourteenth registers (R13, R14), respectively, and (3) for the circuit/extension multiplexers associated with the seventh extension register (E7). These registers are shown in FIG. 3 and form part of the seventh group of registers (G7).

The control word for the first register/multiplier multiplexer associated with the first multiplier (MUL1) causes the first register (R1) to be connected to the first input of the first multiplier (MUL1). The control word for the second register/multiplier multiplexer causes the fifth register (R5) to be connected to the second input of the first multiplier (MUL1). The control word for the circuit/register multiplexer associated with the thirteenth register (R13) causes an output of the first multiplier (MUL1) carrying most significant bits (16–31) to be connected to the thirteenth register (R3). The control word for the circuit/register multiplexer associated with the fourteenth register (R14) causes an output of the first multiplier (MUL1) carrying least significant bits (0–15) to be connected to the fourteenth register (R14). The control word for the circuit/extension multiplexer associated with the seventh extension register (E7) causes an output of the first multiplier (MUL1) carrying extension bits (32–39) to be connected to the seventh extension register (R7).

There is one major difference between the instructions relating to the multipliers and those relating to the arithmetic and logical units. The source fields (FLDS1, FLDS2) of an instruction relating to a multiplier specify registers, as in the example shown in FIG. 9 and described hereinbefore. Conversely, the source fields (FLDS1, FLDS2) of an instruction relating to an arithmetic and logical unit specify groups of registers. In response to such an instruction the control circuit will generate control words for the group/unit multiplexer associated with the relevant arithmetic and logical unit. As a result of this, each input of the relevant arithmetic and logical unit will be coupled to a group of registers (G) as shown in FIG. 3.

The generation of control words as described hereinbefore can be effected, for example, by means of logic circuits or a table in the form of a memory, or a combination of the two. There is a predetermined relationship between the respective values of the instruction fields described hereinbefore and the control words to be applied to the circuits. This relationship can be defined by means of one or more logic tables. There are numerous methods of devising logic circuits for the implementation of these logic tables.

It has already been explained that the control circuit (CPU) reads instructions from the program memory (PMEM) shown in FIG. 2. This can be effected in a customary manner, for example by means of a program counter. The read-out and execution of instructions can be interrupted or restarted by means of an interrupt signal or a reset signal, respectively.

There are several methods of loading the instructions into the program memory (PMEM). This memory may be, for example, of the "read-only" type. In that case, the manufacturer of the memory will load the instructions into this memory. The program memory (PMEM) may alternatively be of the "programmable" type. In that case, it suffices to have access to a medium containing instructions in order to load them into the program memory (PMEM). Such an access is possible by means of a communication network such as, for example, the Internet.

The digital signal processor shown in FIG. 2 can multiply two 32 bit data blocks by carrying out four multiplications. The least significant bits (15–0) of a first 32 bit data block are multiplied by the least significant bits (15–0) of a second data block. The most significant bits (16–31) of the first 32 bit data block are multiplied by the least significant bits (15–0) of the second data block. The least significant bits (15–0) of the first 32 bit data block are multiplied by the most significant bits (16–31) of the second data block. The most significant bits (16–31) of the first 32 bit data block are multiplied by the most significant bits (16–31) of the second data block. The results of these four multiplications are added. This yields the product of the two data blocks.

The digital signal processor (DSP)) shown in FIG. 2, as well as FIGS. 3–9, is an example of an application of the characteristic features illustrated in FIG. 1. The processing circuits (PRC1, PRC2) shown in FIG. 1 respectively take the form of a multiplier (MUL) and an arithmetic and logical unit (ALU), as shown in FIG. 2. The element selection circuit (SELN) shown in FIG. 1 takes the form of a register/multiplier multiplexer(MUXRM) shown in FIG. 4. The group selection circuit (SELW) shown in FIG. 1 takes the form of a group/unit multiplexer (MUXGU) shown in FIG. 5.

The above description with reference to the Figures. illustrates rather than limits the invention. It is evident that there are numerous alternatives within the scope of the appended claims. In conclusion, some remarks are made in this respect.

The characteristic features illustrated in FIG. 1 may be applied to numerous products and processes. FIG. 2 merely shows a possible application involving a digital signal processor. It is likewise possible to use the characteristic features illustrated in FIG. 1 in, for example, a computer.

There are numerous methods of implementing a group of storage elements in accordance with the invention. FIG. 3 merely shows a possible implementation in which two 16 bit registers and one 8 bit register can, in fact, form a 40 bit register. It is likewise possible to use, for example, only 8 bit registers which can, in fact, form a 16 bit register or a 40 bit register. Referring to FIG. 3, the number of storage elements in a horizontal direction (row) or a vertical direction (column) as well as the dimensions of the storage elements may vary in accordance with the type of application.

There are numerous ways of implementing functions by means of items of hardware or software or a combination of the two. In this respect, it is to be noted that the Figures are highly diagrammatic, each Figure representing merely a single embodiment of the invention. Thus, although a Figure shows different functions as separate blocks, this does not exclude the possibility that a single item of hardware or software may perform a plurality of functions. This by no means excludes the possibility that a function may be carried out by a set of hardware or software items.

Finally, the use of the verb "to comprise" does not exclude the presence of any elements or steps other than those defined in a claim. The use of the indefinite article "a" preceding an element or step does not exclude the presence of a plurality of these elements or steps.

What is claimed is:

1. A data processing arrangement comprising:
   at least one processing circuit of a first kind;
   at least one processing circuit of a second kind; and
   a set of storage elements for the temporary storage of data intended for the processing circuits, wherein the arrangement comprises:
      an element selection circuit [SELN] for selecting any single storage element of the set in order to supply the content of the selected storage element to an input of a processing circuit selected from said at least one processing circuit of a first kind; and
      a group selection circuit for selecting a group of storage elements from a plurality of separate groups of storage elements within said set in order to supply the contents of multiple storage elements forming part of the selected group to an input of processing circuit selected from said at least one processing circuit of a second kind, said multiple storage elements being contiguous.

2. A method of data processing by means of a data processing arrangement:
   having at least one processing circuit of a first kind, at least one processing circuit of a second kind, and
   a set of storage elements for the temporary storage of data intended for the processing circuits,
   wherein the method comprises the following steps:
      an element selection step for selecting any single storage of the set in order to supply the content of the selected storage element to an input of a processing circuit selected from said at least one processing circuit of a first kind; and
      a group selection step for selecting a group of storage elements from a plurality of separate groups of storage elements within said set in order to supply the contents of multiple storage elements forming part of the selected group to an input of processing circuit selected from said at least one processing circuit of a second kind, said multiple storage elements being contiguous.

3. A computer program product in a computer readable medium for a data processing arrangement having at least one processing circuit of a first kind, at least one processing circuit of a second kind, and
   a set of storage elements for the temporary storage of data intended for the processing circuits, wherein
   the computer program product comprises:

a first type of instruction configured for bringing about, upon execution, an element selection for selecting any single storage element from said set in order to supply the content of the selected storage element to an input of a processing circuit selected from said at least one processing circuit of a second kind; and a second type of instruction which, when it is executed by the data processing arrangement, brings about a group selection for selecting a group of storage elements from a plurality of separate groups of storage elements within said set in order to supply the contents of multiple storage elements forming part of the selected group to an input of processing circuit of said at least one processing circuit of a second kind, said multiple storage elements being contiguous.

* * * * *